EFFECT OF ETHOMEEN C/15
ON FILTRATION RATE OF AN IRON-CONTAINING
AERATED WATER
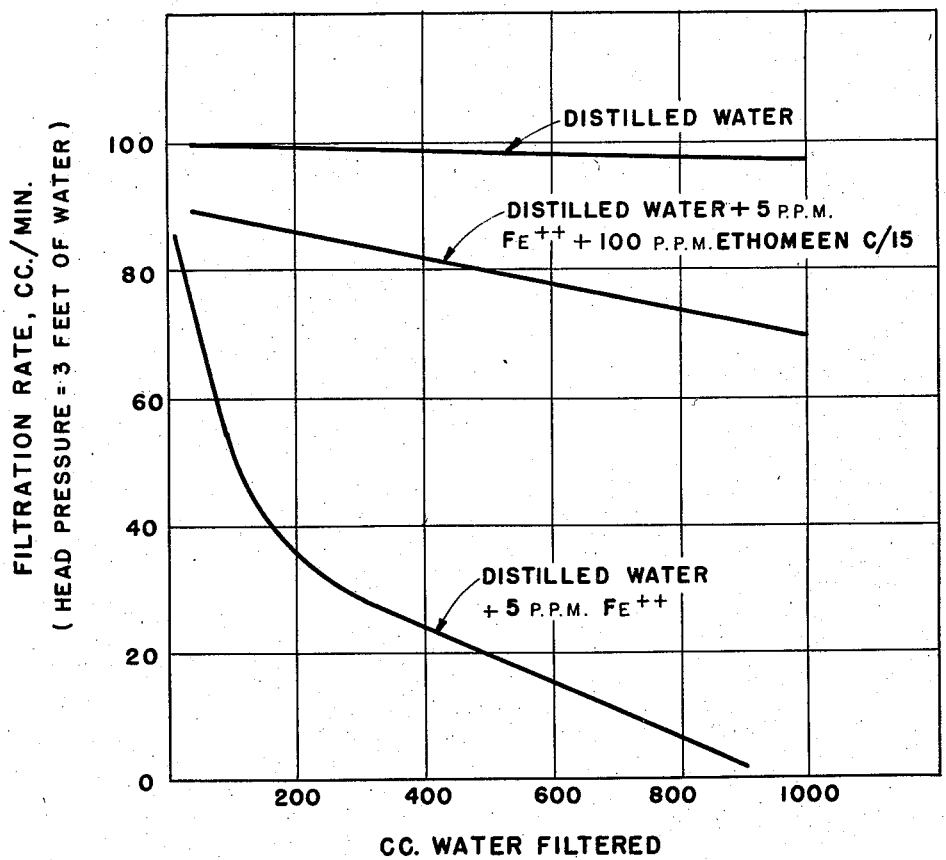

2,894,905
Patented July 14, 1959

2,894,905
INHIBITING PRECIPITATION OF IRON OXIDE FROM IRON-CONTAINING WATERS

George G. Bernard, Crystal Lake, Ill., assignor to The Pure Oil Company, Chicago, Ill., a corporation of Ohio Application May 2, 1958, Serial No. 732,669

8 Claims. (Cl. 210—58)

This invention relates to new and useful improvements in processes for inhibiting the precipitation of iron oxide from waters containing dissolved ferrous compounds, and more particularly to the process in which a small amount of a fatty amine-ethylene oxide reaction product is added to water containing dissolved ferrous compounds to inhibit precipitation of iron oxide therefrom.

When underground water which contains soluble ferrous iron compounds (e.g., ferrous bicarbonate) is brought into contact with air, an insoluble precipitate of iron oxide forms. This precipitate is objectionable in many applications where such water is used for industrial purposes. For example, when such water is injected into underground petroleum-bearing formations in a secondary recovery process, the iron oxide tends to filter out at the bore-hole face and thereby impedes injection operations. So-called "red-waters" (i.e., waters which contain suspended iron oxide) are normally objectionable in most industrial uses, such as in the brewing, paper, and textile industries.

It is therefore one object of this invention to provide a new and improved method for inhibiting the precipitation of iron oxide from water containing dissolved ferrous compounds upon contact with air.

A feature of this invention is the provision of a process of adding a polyethoxyamine to water containing dissolved ferrous compounds to inhibit the precipitation of iron oxide therefrom upon contact with air.

Another feature of this invention is the provision of a process for inhibiting the precipitation of iron oxide from water containing dissolved ferrous compounds by adding to such water a small amount of a reaction product of a primary fatty amine with ethylene oxide.

Other objects and features of this invention will become apparent from time to time throughout the specification and claims as hereinafter related.

In the accompanying drawing, there is presented a graph showing the effect of dissolved ferrous compounds on the filtration rate of water, and a graphical comparison with the filtration rate of distilled water and of water containing dissolved ferrous compounds and the inhibitor used in this invention.

This invention is based upon the discovery that the precipitation of iron oxide from water containing dissolved ferrous compounds can be inhibited by adding to such water a small amount (1–15 mol per equivalent of dissolved iron) of a polyethoxyamine produced by reaction of one mol of a $C_{10}$–$C_{20}$ primary aliphatic amine with 2–7 mols of ethylene oxide. The exact mechanism of these amines in inhibiting precipitation of iron oxide is not known. The amount of amine required to prevent precipitation does not bear an exact relationship to the dissolved iron as in the case of a sequestering agent. It is believed, however, that these amines perform the dual function of delaying or inhibiting oxidation of the ferrous ion by air and maintaining in colloidal suspension the very small amount of iron oxide which does form. This property of inhibiting the precipitation of iron oxide from water containing dissolved ferrous compounds upon contact with air is peculiar to polyethoxyamines of the formula:

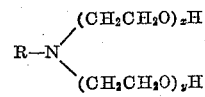

where R is a $C_{10}$–$C_{20}$ aliphatic radical, and $x$ and $y$ are small integers, with $x+y$ being in the range from 2–7. The amines which are used are actually mixtures of compounds of the formula just given since the R group is derived from a fatty material such as coconut oil, soybean oil, tallow, or stearic acid. In carrying out the invention a small amount of the amine, 1–15 mol per mol of dissolved ferrous compound, and preferably 4–10 mol per mol of dissolved ferrous compound may be used. The amine may be added to the water and mixed therewith by any suitable means.

The following specific examples are illustrative of my invention.

EXAMPLE I

Distilled water was passed through a paper filter utilizing a head pressure of 3 ft. of water. The flow through the filter remained substantially constant over a period of time as indicated by the upper line in the graph set forth in the drawings. Then a solution was prepared by adding to distilled water sufficient ferrous bicarbonate to produce an iron concentration of 5 p.p.m. (parts per million). This solution was aerated and turned red from the fine particles of iron oxide formed therein. When this solution was passed through the same filter used for measuring the filtration rate of distilled water, under a head pressure of 3 ft. of water, the flow through the filter diminished at the rate shown in the lower line of the graph in the drawings. As seen from this graph, the filter became almost completely plugged after passing 900 cc. of water. Next, a solution was prepared from distilled water, ferrous bicarbonate in an amount sufficient to produce an iron concentration of 5 p.p.m., and 100 p.p.m. of a polyethoxyamine sold commercially as Ethomeen C/15 by Armour and Company. Ethomeen C/15 is the reaction product of one mol of a primary fatty amine, $RNH_2$, where R is derived from coconut fatty acids, with 5 mols of ethylene oxide and has the general formula:

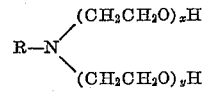

where R is a $C_{10}$–$C_{20}$ aliphatic radical, and $x$ and $y$ are small integers, with $x+y$ being in the range from 2–7. This solution was then thoroughly aerated in an attempt to effect the precipitation of iron oxide therefrom. However, the solution remained clear and did not appear to contain any suspended matter. The aerated solution was then passed through a clean filter of the same type used in testing the distilled water, under a head pressure of 3 ft. of water. The rate of flow through the filter declined slightly as shown by the intermediate line in the graph. As seen from this graph, the addition of the Ethomeen C/15 inhibited the precipitation of iron oxide and maintained a high rate of flow through the filter at a point where the solution containing no inhibitor had completely stopped up the filter.

EXAMPLE II

In another experiment, a solution was prepared from distilled water and ferrous bicarbonate having an iron concentration of 5 p.p.m. To this solution there was added sufficient amount of a polyethoxyamine, Ethomeen C/12, to produce a concentration of 3 mols of the amine per mol of dissolved iron. Ethomeen C/12 is a product of Armour & Co., produced by reacting a primary amine $RNH_2$, where R is derived from coconut oils, also known as cocoamine, with 2 mols of ethylene oxide. When this solution was aerated, it remained clear and no suspended iron oxide was observed. When this solution was passed through a filter, the rate of filtration dropped off slightly with time, compared to the filtration rate for distilled water with time, but continued to pass through the filter at a high rate at a point where a solution containing no inhibitor had completely clogged the filter.

EXAMPLE III

The effect of other polyethoxyamines in inhibiting precipitation of iron oxide was evaluated in a series of experiments, the results of which are set forth in Table I. In each case a small amount of the amine, in the proportion indicated in the table, was added to a solution containing 5 p.p.m. of iron, as ferrous bicarbonate, in distilled water. The solution was thoroughly aerated and observed for precipitation of iron oxide.

Table I

EFFECT OF POLYETHOXYAMINES ON PRECIPITATION OF IRON OXIDE FROM AERATED SOLUTIONS CONTAINING 5 P.P.M. OF FERROUS ION

| Amine | Mols Amine/ Mols Fe | Precipitate | Mols Amine/ Mols Fe | Precipitate |
|---|---|---|---|---|
| Ethomeen C/20 [1] | 1.0 | Yes | 3.0 | Yes. |
| Ethomeen S/12 [2] | 1.0 | No | 3.0 | No. |
| Ethomeen S/15 [3] | 1.0 | No | 3.0 | No. |
| Ethomeen S/20 [4] | 1.0 | Yes | 3.0 | Yes. |
| Ethomeen S/25 [5] | 1.0 | Yes | 3.0 | Yes. |
| Ethomeen T/12 [6] | 1.0 | No | 3.0 | No. |
| Ethomeen T/15 [7] | 1.0 | No | 3.0 | No. |
| Ethomeen T/25 [8] | 1.0 | Yes | 3.0 | Yes. |
| Ethomeen 18/15 [9] | 1.0 | No | 3.0 | No. |
| Ethomeen 18/60 [10] | 1.0 | Yes | 3.0 | Yes. |

[1] Reaction product of 1 mol. of cocoamine with 2 mols of ethylene oxide.
[2] Reaction product of 1 mol. of soybean amine with 2 mols of ethylene oxide.
[3] Reaction product of 1 mol of soybean amine with 5 mols of ethylene oxide.
[4] Reaction product of 1 mol of soybean amine with 10 mols of ethylene oxide.
[5] Reaction product of 1 mol of soybean amine with 15 mols of ethylene oxide.
[6] Reaction product of 1 mol of tallow amine with 2 mols of ethylene oxide.
[7] Reaction product of 1 mol of tallow amine with 5 mols of ethylene oxide.
[8] Reaction product of 1 mol of tallow amine with 15 mols of ethylene oxide.
[9] Reaction product of 1 mol of stearyl amine with 5 mols of ethylene oxide.
[10] Reaction product of 1 mol of stearyl amine with 50 mols of ethylene oxide.

In each case the amine is a primary amine of the formula $RNH_2$ where R is derived from the fatty oil or fatty acid indicated.

From the data presented in Table I, it is seen that only polyethoxyamines of the formula $$R-N\begin{matrix}(CH_2CH_2O)_xH \\ (CH_2CH_2O)_yH\end{matrix}$$

where R is a $C_{10}-C_{20}$ aliphatic radical, and $x$ and $y$ are small integers, with $x+y$ being in the range from 2–7, are useful for inhibiting precipitation of iron oxide from water containing dissolved ferrous ion upon contact with air.

In another series of experiments several known surfactants were tested for possible utility in inhibiting the precipitation of iron oxide from water containing dissolved ferrous ion, upon contact with air. In each case the material tested was added to aerated distilled water containing dissolved ferrous ion, in a mol ratio of about 3:1 relative to the dissolved iron. The surfactants which were tested were:

(1) Dodecyl trimethyl ammonium chloride.
(2) A polyethoxyamine of the formula:

$$RNH(CH_2CH_2O)_{15}H$$

where R is a mixture of tertiary $C_{18-24}$ alkyl radicals.
(3) Polyoxyethylene sorbitan monolaurate, sold commercially as Tween 21.
(4) The reaction product of one mol of $RC(O)NH_2$, where R is derived from hydrogenated tallow acids, with 50 mols of ethylene oxide.
(5) A primary amine acetate of the formula $$RNH_2 \cdot HAc$$

where R is derived from tallow fatty acids and Ac is the acetate radical. In every case these materials were ineffective in preventing the precipitation of iron oxide. When these materials were added to solution of ferrous ion in distilled water and the solution aerated, a precipitate of iron oxide was formed or the water was made milky by suspended particles. These experiments indicate clearly that the surfactants tested are ineffective for inhibiting the precipitation of iron oxide from water containing dissolved ferrous ion, upon contact with air.

While I have described my invention fully and completely as required by the patent laws, including several preferred embodiments thereof, I wish it understood that within the scope of the appended claims this invention may be practiced otherwise than as specifically described.

What is claimed is:

1. A method of inhibiting precipitation of iron oxide from water, containing dissolved ferrous compounds, upon exposure to air, which comprises adding to said water 1–15 mols per mol of soluble ferrous compound of at least one polyethoxyamine of the formula:

$$R-N\begin{matrix}(CH_2CH_2O)_xH \\ (CH_2CH_2O)_yH\end{matrix}$$

where R is a $C_{10}-C_{20}$ aliphatic radical, and $x$ and $y$ are small integers, with $x+y$ being in the range from 2 to 7.

2. A method in accordance with claim 1 in which R is an n-$C_{18}$ alkyl radical.

3. A method in accordance with claim 1 in which R is a mixture of aliphatic radicals derived from coconut oil.

4. A method in accordance with claim 1 in which R is a mixture of aliphatic radicals derived from soybean oil.

5. A method in accordance with claim 1 in which R is a mixture of aliphatic radicals derived from tallow.

6. A method in accordance with claim 1 in which $x+y=2$.

7. A method in accordance with claim 1 in which $x+y=5$.

8. A method in accordance with claim 1 in which the amine is the reaction product of one mol of a primary $C_{10}-C_{20}$ aliphatic amine with 2–7 mols of ethylene oxide.

References Cited in the file of this patent

UNITED STATES PATENTS

| 2,510,063 | Bried | June 6, 1950 |
| 2,739,980 | Chester | Mar. 27, 1956 |
| 2,813,044 | Chester | Nov. 12, 1957 |

FOREIGN PATENTS

| 742,626 | Great Britain | Dec. 30, 1955 |

OTHER REFERENCES

Chemical Materials Catalog, 1952–53 pages 173–175, publ. by Reinhold, N.Y.